Sept. 26, 1933.  J. K. MATTER ET AL  1,928,298
COOKING UTENSIL LID
Filed Dec. 1, 1931

INVENTORS
James K. Matter
Joseph J. Weinzierl
BY
Their Attorney

Patented Sept. 26, 1933

1,928,298

UNITED STATES PATENT OFFICE 1,928,298

COOKING UTENSIL LID

James K. Matter and Joseph T. Weinzierl, New Kensington, Pa., assignors to The Aluminum Cooking Utensil Company, New Kensington, Pa., a corporation of Pennsylvania Application December 1, 1931. Serial No. 578,282

5 Claims. (Cl. 53—1)

The invention relates to a venting arrangement for cooking vessels, and more particularly to a concealed venting arrangement associated with the cover and handle or knob of a domestic cooking vessel.

In certain types of cooking vessels it is desirable to provide vents for the purpose of allowing the escape of steam or water vapor, or to allow the ingress of air so that the contents of the vessel can flow out through another opening or openings without necessitating removal of the cover. The purpose of the vents depends upon the type of vessel or container with which they are used and bears no inseparable relationship to the present invention.

Although vents of this character have been employed heretofore in many types of cooking vessels, their use has been confined, for the most part, to vessels intended for use in the kitchen as distinguished from vessels of the type which are intended for table use, or which are adapted for occasional use outside of the kitchen. Ordinary vent holes and other venting arrangements heretofore proposed or used detract from the appearance of the vessel or cover in which they are placed, rendering it unsatisfactory or undesirable for use on the tea wagon or dining room table. An example of this type of vessel may be found in the well known drip coffee maker. It is desirable to vent the top or cover of a drip coffee maker; yet at the same time, plainly visible venting arrangements would mar the appearance of the coffee maker and make it less suitable for use in dining or drawing rooms.

It is an object of this invention to provide a venting arrangement which is concealed from view and which is adapted for use with cooking vessels of various types. It is also an object of this invention to provide a venting arrangement which is associated with the handle or knob of the vessel to which it is applied and which by reason of such association provides further special advantages as will hereinafter appear.

A particular object of the invention is to provide a venting arrangement which assists in positioning and securing in place the handle of the vessel. Other objects and advantages will appear more fully in the description of the following illustrative embodiment of the invention taken in connection with the accompanying drawing, in which.

Figure 1:
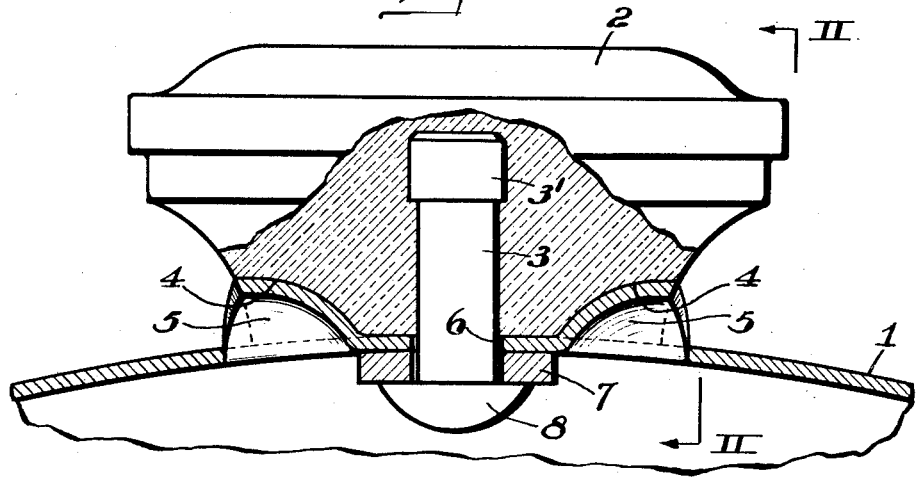
Fig. 1 is an enlarged fragmentary view, partially in vertical section, of the top or cover of a vessel, showing the relationship of my improved venting arrangement to the cover and handle assembly.

In the drawing, 1 represents the cover or top of a cooking vessel to which the handle or knob 2 is affixed in a convenient manner, as by the rivet stud 3. In the preferred design, as shown, the rivet stud is provided with an enlarged shouldered inner end 3' to lag it in place in the moulded handle member 2. It will be understood that such other securing means may be substituted as may be desired, and that the handle may be of any of the well known forms, having one point of attachment as herein illustrated or a plurality of points of attachment as in the case of a U-shaped handle.

At its underside, handle member 2 is provided with one or a plurality of recessed portions 4 in the form of channels opening outwardly at the side or stem of the handle member and disposed underneath the enlarged gripping portion thereof. Portions of the cover member 1 are struck upwardly at points directly adjacent said recessed portions of the handle member, forming the venting channels 5 which lie within the recesses 4 when the parts are assembled. There is also punched in the cover the usual aperture 6 to receive the attaching element 3.

In the manufacture of vessels or covers therefor embodying our invention the vents 5 and aperture 6 may conveniently be formed before the parts are assembled. The pre-formed handle member with its attaching element 3 is then put in place. It will here be evident that the vents 5 serve the purpose of accurately positioning the handle during the operation of assembling the parts. This is particularly advantageous when an oval-shaped, or other-than-round, design of handle member is to be associated with a similarly-shaped, or other-than-round, design of cover. Good apearance demands that the handle and cover be aligned in symmetrical relationship, and by our invention this is insured without dependence on the skill of the workman in the assembly thereof.

Figure 2:
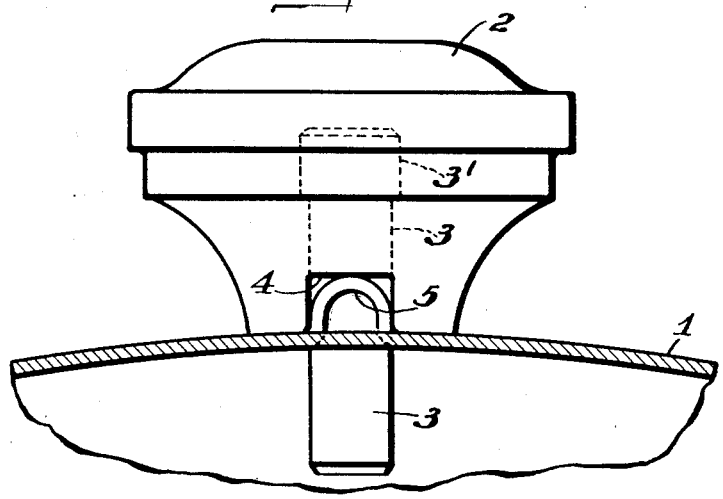
Fig. 2 is a section taken on the line II—II of Fig. 1, but showing the relationship of the parts before the handle has been riveted in place.
Figure 3:
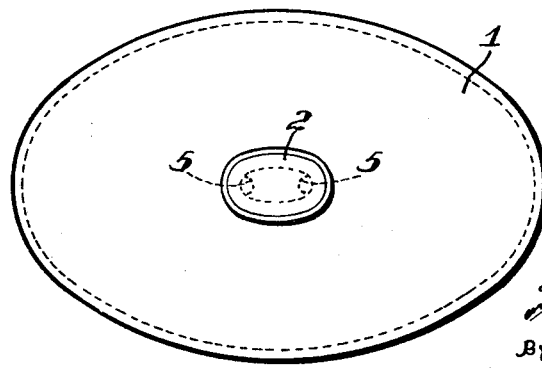
Fig. 3 is a plan view, to a smaller scale, depicting the general arrangement of cover, handle, and venting arrangement.

A washer 7 is slipped over the inwardly projecting rivet stud 3 (Fig. 2) and the rivet headed up as at 8 (Fig. 1) to securely lock the parts in position. The vents 5 assist in locking the handle member 2 in position and prevent its turning with respect to the cover member, thus eliminating one of the causes of loosened handles without departing from the simple conventional securing rivet or equivalent bolt.

The vents 5 protect and shield the handle member from steam or water vapor escaping from the vessel. Steam tends to deteriorate wood and compositions from which handles are frequently made but in our preferred design this difficulty is minimized or entirely eliminated.

It will be seen that we have provided a venting arrangement which is virtually concealed from view, which aids in correctly positioning the handle during and after assembly, and which protects the handle from steam. We have at the same time provided an arrangement of handle and cover which is simple in design, easy to manufacture, and which offers many advantages from the standpoints of both appearance and utility.

While in describing our invention we have, in the interest of clarity, employed specific language, we have no intention, in the use of such language, of excluding any equivalents or minor variations of the invention set forth.

We claim:

1. In a domestic cooking vessel, a cover member, a handle member secured to said cover member and provided with a recess in its underside, a portion of said cover member being upstruck to extend into said recess and thereby provide a concealed vent.

2. A combined handle-positioning and venting arrangement for culinary articles comprising a vessel, a handle, and means for rigidly securing said handle to said vessel, said securing means comprising interlocking venting channels in said vessel and handle preventing rotation of the handle.

3. In a domestic cooking vessel, a cover member, and a handle member secured thereto, said cover member being provided with a vent in a part thereof beneath said handle member, and said vent being entirely concealed from above by said handle member.

4. In a cooking vessel, a cover member, a handle member secured thereto, handle-positioning means formed in said cover member, said handle-positioning means comprising upstruck portions of said cover member adapted to enter recesses in said handle member.

5. In a cooking vessel, a cover member, a handle member secured thereto, venting recesses disposed on the underside of said handle member, portions of said cover member adjacent said recesses being upstruck thereinto, whereby said upstruck portions definitely position said handle and prevent its rotation relative to the cover member.

JAMES K. MATTER.
JOSEPH T. WEINZIERL.